United States Patent
Saxena et al.

(10) Patent No.: US 7,145,880 B2
(45) Date of Patent: Dec. 5, 2006

(54) SYSTEM AND METHOD FOR CHANNEL ASSIGNMENT WITH ADAPTIVE MODULATION IN WIRELESS COMMUNICATIONS

(75) Inventors: Alok Saxena, Redmond, WA (US);
David Russo, Woodinville, WA (US);
Don Wahlstrom, Woodinville, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 903 days.

(21) Appl. No.: 10/131,947

(22) Filed: Apr. 24, 2002

(65) Prior Publication Data

US 2003/0202478 A1    Oct. 30, 2003

(51) Int. Cl.
*G08C 15/00*    (2006.01)

(52) U.S. Cl. .................. 370/252; 370/347; 370/465

(58) Field of Classification Search ............... 370/252, 370/465; 455/69, 452.1, 452.2; 375/261, 375/272; 725/111
See application file for complete search history.

(56) References Cited

U.S. PATENT DOCUMENTS 6,091,932 A * 7/2000 Langlais .................. 725/111
6,456,627 B1 * 9/2002 Frodigh et al. ............. 370/465
6,542,736 B1 * 4/2003 Parkvall et al. ........... 455/452.2
6,549,759 B1 * 4/2003 Arviv et al. ................. 455/69
6,760,590 B1 * 7/2004 Miyoshi et al. ........... 455/452.1

* cited by examiner

*Primary Examiner*—Hassan Kizou
*Assistant Examiner*—Albert T. Chou
(74) *Attorney, Agent, or Firm*—Woodcock Washburn LLP (57) ABSTRACT

Embodiments include a system and method for solving a wireless communications channel packing problem by using a cost-like accounting metric that includes channel packing efficiency as well as modulation efficiency, channel conditions and or noise thresholds. The cost-like accounting metric is used to adjust the rated effectiveness of using each available modulation scheme where modulation schemes in adjacent spectrum will produce differing degrees of packing efficiency. By selecting those available carrier wave modulation schemes based on channel conditions versus noise threshold and accounting for packing factor as well as modulation efficiency, some embodiments the invention achieve higher quality within the framework of creating the greatest overall channel efficiency by selecting the best modulation scheme for each part of the spectrum being used.

32 Claims, 9 Drawing Sheets

Definition of Packing Factor for 22 tone bin in 33 tone cluster

Definition of Packing Factor for 33 tone bin in 33 tone cluster

16QAM/QPSK
candidate

SYSTEM AND METHOD FOR CHANNEL ASSIGNMENT WITH ADAPTIVE MODULATION IN WIRELESS COMMUNICATIONS

TECHNICAL FIELD

Embodiments of the invention relate generally to wireless communications.

BACKGROUND

Electromagnetic bandwidth for communications is a limited and some times very costly resource. For example, auctions of licensed spectrum have garnered the equivalent of billions of dollars for various governments, including that of the United States of America. Given the considerable expense that companies such as wireless voice communications companies must bear to acquire the right to use a valuable portion of the electromagnetic spectrum, there is considerable emphasis on efficiently using that spectrum from an economic perspective both to justify the purchase of spectrum and to create and/or perpetuate a profitable enterprise. One approach to maximizing the economic efficiency of a portion of licensed spectrum is to permit the maximum number of paying customers to use that spectrum as possible. In digitized voice communications, this can mean packing as many simultaneous conversations into the spectrum as possible, while maintaining the quality of the communications.

Maximizing the efficient use of electromagnetic spectrum for communications faces a number of obstacles. The electromagnetic spectrum, even licensed electromagnetic spectrum, is unfortunately susceptible to electromagnetic noise that affects the quality of the communication signals being transmitted through it. Correspondingly, although communication signals can be modulated onto one or more carriers with frequencies within the licensed spectrum by a variety of different modulation schemes, in general, the more efficient the modulation scheme is at squeezing information onto the carriers, the more susceptible that scheme is to the effects of noise which affect the quality of the underlying communications. Accordingly, it would be desirable to have a system and method for mitigating these problems in order to more efficiently use the available electromagnetic spectrum.

In the drawings, the same reference numbers identify identical or substantially similar elements or acts. To easily identify the discussion of any particular element or act, the most significant digit or digits in a reference number refer to the Figure number in which that element is first introduced, e.g., element 102 is first introduced and discussed with respect to FIG. 1.

Note that the headings provided herein are for convenience and do not necessarily affect the scope or interpretation of the invention.

DETAILED DESCRIPTION

Aspects of some embodiments of the invention overcome many of the limitations described in prior and current signal modulation schemes and provide additional benefits by creating an efficient scheme for channel assignment in conjunction with adaptive modulation for wireless communications. The system and method of some embodiments of the invention employ adaptive signal modulation in accordance with numerically valued modulation efficiency and channel packing efficiency while taking channel conditions into account. Adaptive modulation is used to select different modulation schemes depending on the channel conditions within each channel. As is described in more detail herein, given the constraint of providing an acceptable quality voice communications channel, the most efficient modulation scheme is selected in conjunction with a determination of the channel characteristics and packing those channels into adjacent portions of the electromagnetic spectrum. In general, the greater the efficiency of the modulation scheme, the better the required channel characteristics. The inventors have observed that channel characteristics can vary considerably within a range of licensed spectrum so that different modulation schemes with differing degrees of communication efficiency can be utilized in adjacent portions of that spectrum. The inventors came to the realization that the essentially random use of different modulation schemes in adjacent portions of spectrum, while producing an optimized result for each portion of the spectrum used, can create a channel packing problem for the spectrum as a whole, thereby reducing the overall efficiency. As described in detail herein, some embodiments of the invention address the channel packing problem identified by the inventors by using a cost-like accounting metric that includes channel packing efficiency and modulation efficiency with limits on channel conditions. The cost-like accounting metric is used to adjust the rated effectiveness of using each particular modulation scheme in view of the fact that modulation schemes in adjacent spectrum will produce differing degrees of packing efficiency. By accounting for packing factor as well as modulation efficiency and channel conditions, the invention achieves higher quality while creating the greatest overall channel efficiency by selecting the best modulation scheme for each part of the spectrum being used.

Different signal modulation schemes have differing levels of bandwidth efficiency that are generally traded off against resistance to channel noise. In some embodiments of the invention, channel noise is the result of interference from other communications and spurious noise, both of which tend to degrade the quality of communications. For example, in some embodiments of the invention signal modulation is selected from three different modulation schemes, specifically, quadrature phase shift keying ("QPSK"), 16-ary quadrature amplitude modulation ("16-QAM") and 64-ary quadrature amplitude modulation ("64-QAM"). Underlying these methods are two phase-synchronized sinusoidal waveforms that are substantially 90 degrees out of phase. From a theoretical point of view, there are an infinite number of possible combinations of positions (phase and amplitude) of these waveforms at any given point in time. The QPSK, 16-QAM and 64-QAM methods confine the number of distinctly interpreted regions to 4, 16 and 64 different possibilities each, respectively. Thus, in QPSK, the number of binary bits that can be transmitted through the four possible combinations of the two waveforms is $\log_2(4)=2$. Likewise, the number of binary bits that can be transmitted through the 16 different possibilities of 16-QAM is $\log_2(16) =4$ and the 64 different possibilities of 64-QAM permit the transmission of $\log_2(64)=6$ bits. In summary, QPSK transmits 2 encoded bits, 16-QAM transmits 4 encoded bits and 64-QAM transmits 6 encoded bits of information for two phase-synchronized carrier waves in a given time period, giving rise to distinct throughput differences in terms of bits per time period. Therefore, 64-QAM is more efficient at packing bits of data, e.g., representing digitized voice, into a given time period than 16-QAM, which in turn is more efficient than QPSK, however, this efficiency comes at a price.

Figure 1:
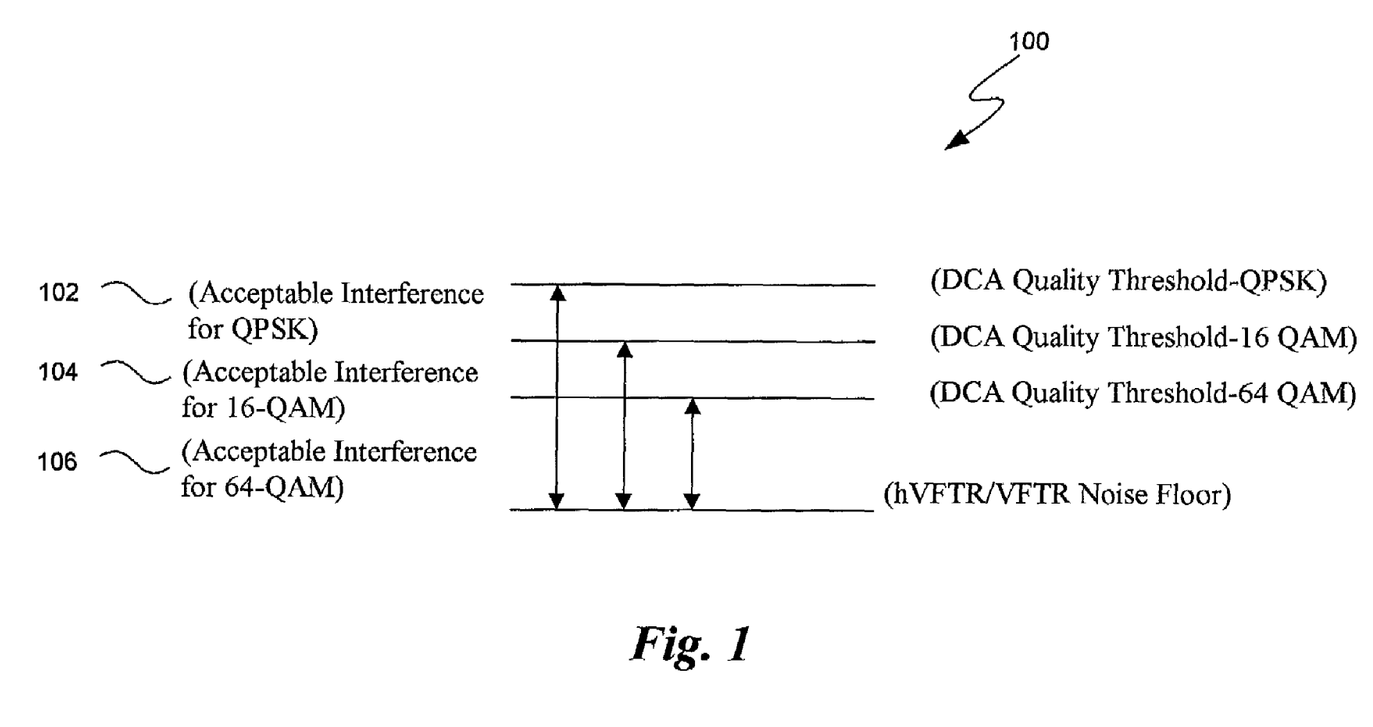
FIG. 1 is a diagram (not to scale) illustrating the relative acceptable electromagnetic noise tolerances of three representative modulation schemes, i.e., QPSK, 16-QAM and 64-QAM.

Because 64-QAM is interpreted to have 64 different waveform combinations per time period, as opposed to 16 for 16-QAM and 4 for QPSK, and because all modulation schemes use the same underlying carrier signals or spectrum "slice", 64-QAM is the least robust of the three modulation schemes in the face of deleterious channel conditions such as interference and noise because each allowed carrier combination is only approximately one fourth of the range of 16-QAM and approximately one sixteenth of the range of QPSK. Turning to FIG. 1 by way of example, in terms of effect, the same amount of noise that may not appreciably affect the transmission of data by QPSK could result in an improper interpretation of the states being transmitted in 64 QAM or to a lesser degree, 16 QAM. FIG. 1 illustrates a chart (not to scale) 100 showing the relative tolerances of the QPSK 102, 16-QAM 104 and 64-QAM 106 modulation schemes. It can be seen the noise tolerance is highest for QPSK 102, moderate for 16-QAM 104 and lowest for 64-QAM 106. Thus, a tradeoff exists between the amount of information that can be transmitted for a given segment of time versus the robustness of the modulation scheme in the face of unfavorable channel conditions.

The invention employs an adaptive modulation scheme. In some embodiments of the invention, adaptive modulation works by assigning a value to the channel conditions to reflect the quality of the channel for signal modulation. Based on the channel conditions, a modulation scheme is chosen, thus the system adapts to the channel conditions by selecting the best modulation scheme available for that channel. Because adjacent channels may have different channel conditions and therefore different modulation schemes, the inventors have realized that channel assignment packing to prevent unused, i.e., wasted, spectrum would be advantageous.

Figure 2:
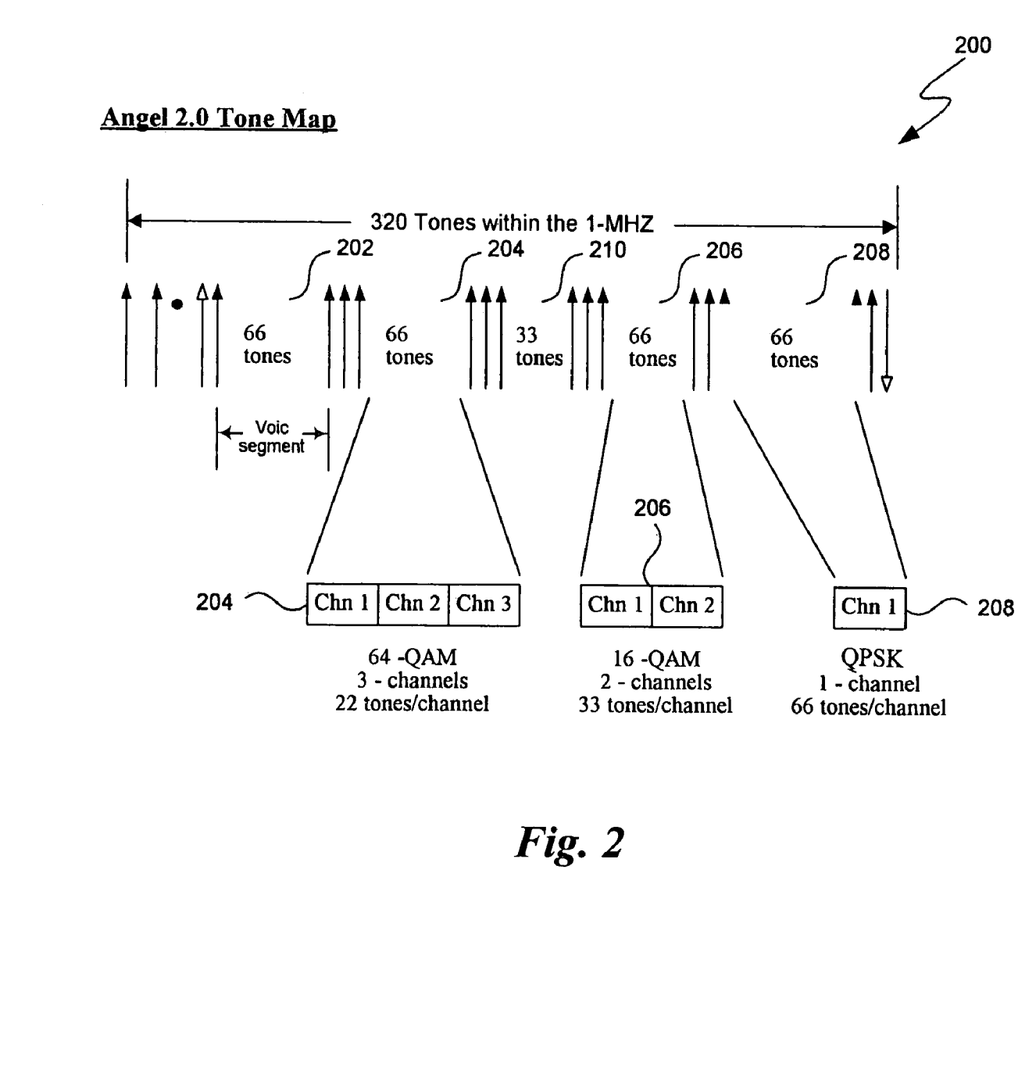
FIG. 2 is a diagram illustrating a representative 1 MHz slice of electromagnetic spectrum including four clusters each containing 66 tones, and a smaller cluster containing 33 tones.

Turning to FIG. 2, we have a representative 1 MHz slice of electromagnetic spectrum 200 for use in accordance with some embodiments of the invention. The 1 MHz slice of electromagnetic spectrum 200 is divided into four clusters 202, 204, 206 and 208 each containing 66 tones, and a single, smaller cluster 210 containing 33 tones (each separated by guard bands). The 1 MHz 200 is divided into 320 tones, each tone comprising 1000 KHz/320 tones=3.125 kHz/tone. By way of example, each tone is modulated by either the QPSK, 16-QAM or 64-QAM methods as described herein, thereby delivering 2, 4 or 6 bits respectively in each frame. In some embodiments of the invention a time division multiple access (known as "TDMA") frame of 7.5 milliseconds is used.

To form a voice channel, the number of tones required is proportional to the efficiency of the modulation method employed in transmitting the digitized bits representing voice. Voice-grade telephone calls typically employ 8-bit digitized samples at 8192 samples per second for a total bandwidth of 64 kbps. In some embodiments of the invention, the original 64 kbps digitized voice data stream is compressed to approximately 11.8 kbps. To transmit this 11.8 kbps stream with some margin and potentially some other signaling information, some embodiments of the invention employ QPSK, 16-QAM and 64-QAM as described herein. QPSK uses 66 tones, each providing 2 bits per frame, each frame lasting 7.5 milliseconds, in order to provide 66×2/0.0075=17.6 kbps of bandwidth for each voice channel. 16-QAM uses 33 tones, each providing 4 bits per frame to provide 17.6 kbps of bandwidth each voice channel. 64-QAM uses 22 tones, each providing 6 bits per frame to provide 17.6 kbps of bandwidth to each voice channel. In each case the voice channel has 17.6 kbps of bandwidth available to carry the digitized voice call.

Again referring to FIG. 2, by way of example, cluster 204 is shown expanded into additional detail with a 64-QAM modulation scheme, thus allowing the 66 tones present in cluster 204 to be divided into three voice channels each including 22 tones. In a similar fashion, cluster 206 is shown expanded into additional detail with a 16-QAM modulation scheme, thus allowing the 66 tones present in cluster 206 to be divided into two voice channels each including 33 tones. Finally, cluster 208 is shown expanded into additional detail with a QPSK modulation scheme, thus allowing the 66 tones present in cluster 208 to support a single voice channel of 66 tones. By way of comparison, if all the clusters 202–210 present in the entire 1 MHz 100 were to use 64-QAM, 16-QAM or QPSK exclusively, the 1 MHz 200 would mathematically be able to support 13, 9 and 4.5 voice channels respectively. Because in some embodiments of the invention QPSK can be used as non-contiguous half channels, the 1 MHz can support 4.5 QPSK voice channels, but the 64-QAM channel cannot be split this way so only whole number 64-QAM channels can be used.

Thus, each 66 tone cluster 202, 204, 206 and 208 can support 64-QAM, 16-QAM and QPSK modulation schemes or combinations of 64-QAM and 16-QAM. In practice, varying conditions within each 66 tone cluster 202–208 can militate towards combining 64-QAM and 16-QAM within those clusters 202–208, however, the inventors have concluded that how the channel modulation schemes are selected and packed into each cluster 202–208 affect the overall performance of the available spectrum 200. For example, if a 64-QAM (22 tones) type modulation is selected for the middle channel of a 66 tone cluster 202–208, then there is a risk that the channels on either side of the middle channel, each being 22 tones, may be suffering from channel conditions that do not permit the use of 64-QAM, in which case 2×22=44 tones are unusable. In this situation the inventors have realized that it may have been preferable to use two adjacent 16-QAM type modulation schemes for a total throughput of 4×2=8 bits as opposed to 6×1=6 bits for the single 64 QAM type modulation scheme. Moreover, the two 16-QAM channels would have been more resistant to noise, thus providing a far better solution than assigning the most efficient modulation scheme available based merely on channel conditions and modulation efficiency.

The 33 tone cluster 210 does not suffer from this problem because only one channel can be supported there with either the 64-QAM (22 tones) or 16-QAM (33 tones) modulation schemes. Stated another way, there is no multiple channel packing problem in cluster 210 because cluster 210 is too small relative to the number of tones needed to support a channel in the available modulation schemes, i.e., no more than one of even the smallest channels can fit into the 33 tones available in this cluster 210. The cost of this simplicity is a loss of flexibility, because QPSK cannot be used, and the use of 64-QAM will always result in 11 unusable tones.

Figure 3:
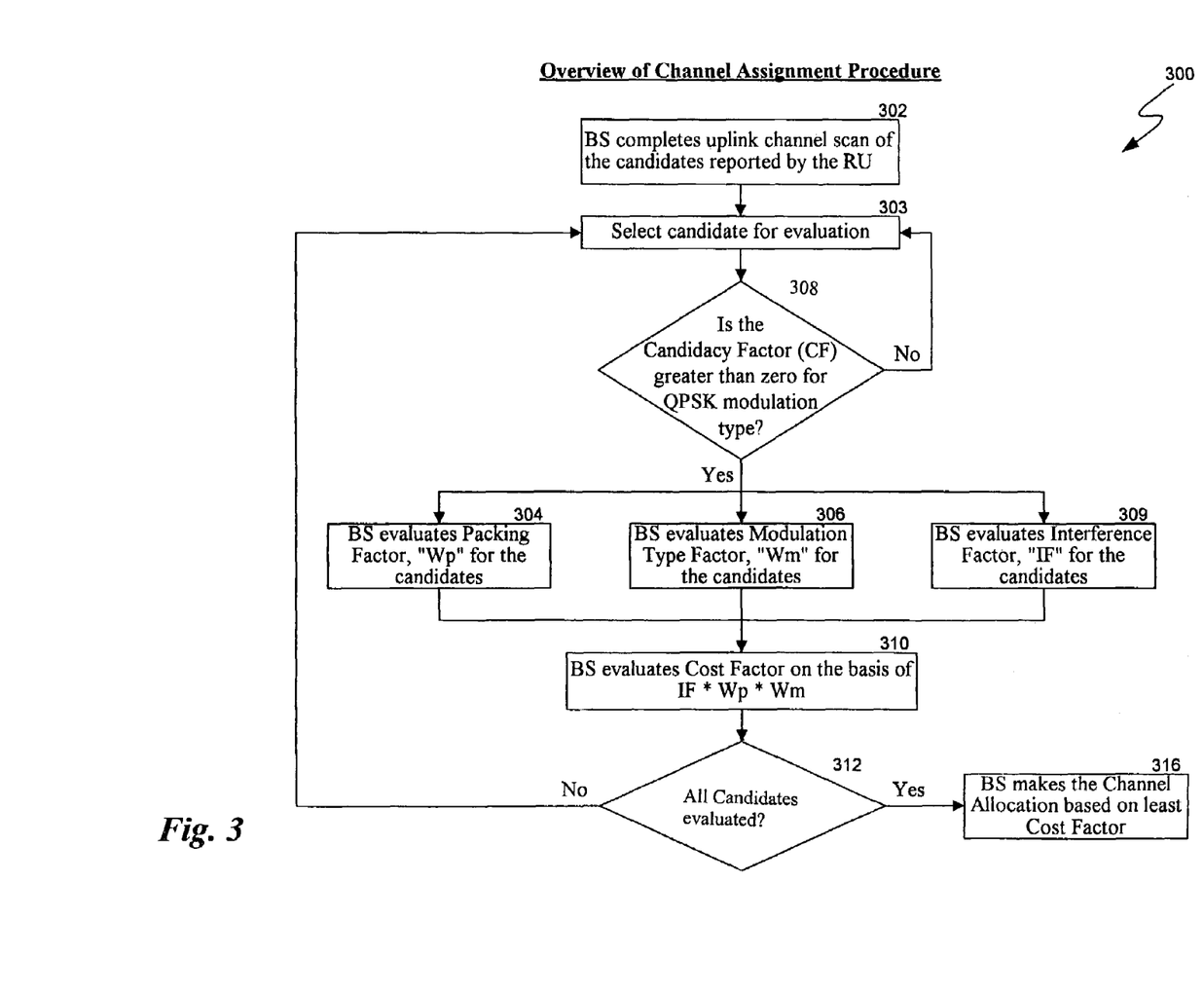
FIG. 3 is a flowchart illustrating an overview of the channel assignment procedure.

Turning to FIG. 3, the inventors have recognized the need to account for the relative costs in different channel packing orders corresponding to different modulation schemes. Some embodiments of the invention employ the following equation to determine a cost factor in order to better evaluate the suitability of each available modulation scheme for any given channel:

$$\text{Cost Factor} = IF \times W_p \times W_m$$

The term IF is an interference factor, and is based in part on the average of the candidacy factors on the given set of uplink tones and associated downlink tones, as further described herein. $W_p$ is the Packing Factor and corresponds to the risk of creating one or more situations where a less than optimal packing can occur in combination with the magnitude of the associated penalty of those situations. The term $W_m$ is the Modulation Type Factor which corresponds to the efficiency of transmitting bits per frame in a certain amount of tones. As a threshold matter, the Cost Factor equation in not reached for any given modulation scheme unless a Candidacy Factor ("CF") is less than a Noise Threshold ("$N_t$") for that modulation scheme. The Candidacy Factor is measured with pilot signals or other channel data and represents the amount of noise on the potential channel being considered as a candidate for a voice channel. In one embodiment, the pilot signals are transmitted from a wireless telephone to a base station. Pilot signals are often used for synchronization purposes, here however, pilot signals are used to derive a stable reference level source via an automatic gain control action on the pilot signals transmitted by the Base Station. This stable reference level helps to define DCA Quality threshold which in turn is used to derive the Candidacy Factor against the measured received signal strength indication ("RSSI") levels of the tone cluster in question. RSSI reflects the amount of interference present and in one embodiment is measured in dBm. As described in detail herein, each modulation scheme can tolerate only so much noise and therefore has a Noise Threshold ("$N_t$"). CF is compared against $N_t$ to determine whether the channel is a viable candidate for that modulation scheme or not. If that channel is a viable candidate, then the base station ("BS") evaluates the Cost Factor against other modulation candidates in order to determine the least costly candidate.

In FIG. 3, there is illustrated an overview of a suitable channel assignment procedure 300. In step 302 the BS completes an uplink/downlink channel scan of the channel candidates reported by the receiver unit ("RU"). This scan provides the information for calculating the Packing Factor in step 304, the Modulation Factor in step 306 and the Candidacy Factor in step 308 and correspondingly, the Interference Factor ("IF") in step 309. After step 302, the BS selects a candidate for evaluation in step 303 and proceeds to step 308. In step 308, the BS evaluates the Candidacy Factor to determine if it is greater than zero for QPSK modulation, if it is not then the BS returns to step 303 and selects another candidate for evaluation because this is an unviable candidate, if it is greater than zero then the BS proceeds to the next steps 304, 306 and 309, which are performed in parallel. In step 304 the BS evaluates the Packing Factor $W_p$ for the candidate channels for the next voice channel. This process is described in FIGS. 5–8 and elsewhere herein. In step 306 the BS evaluates the Modulation Type Factor $W_m$ as described herein, for the candidate channels for the next voice channel. In step 309 the BS evaluates the Interference Factor ("IF"). IF is calculated by dividing one by the average of the candidacy factors on the given set of uplink tones and associated downlink tones. This process is described in FIG. 6 and elsewhere herein. After the $W_p$, $W_m$ CF and IF variables have been determined, The BS proceeds to step 310, where the BS evaluates as a threshold matter whether noise represented by CF is less than the noise threshold $N_t$ for that modulation type. If CF is acceptable, the analysis continues, if not, the analysis stops for that modulation scheme. Assuming CF is acceptable, the BS evaluates the overall Cost Factor for each potential channel selection and provides a Cost Factor number associated with those potential channel selections. After step 310, the BS proceeds to step 312 where it queries whether all the candidates have been evaluated, if not the BS returns to step 303 and selects another candidate, if all candidates have been evaluated, the BS proceeds to step 316. In step 316 the BS allocates the channel to the best candidate, i.e., selects the candidate and modulation scheme, based on which candidate had the lowest cost factor associated with the available potential candidate selections.

Figure 4:
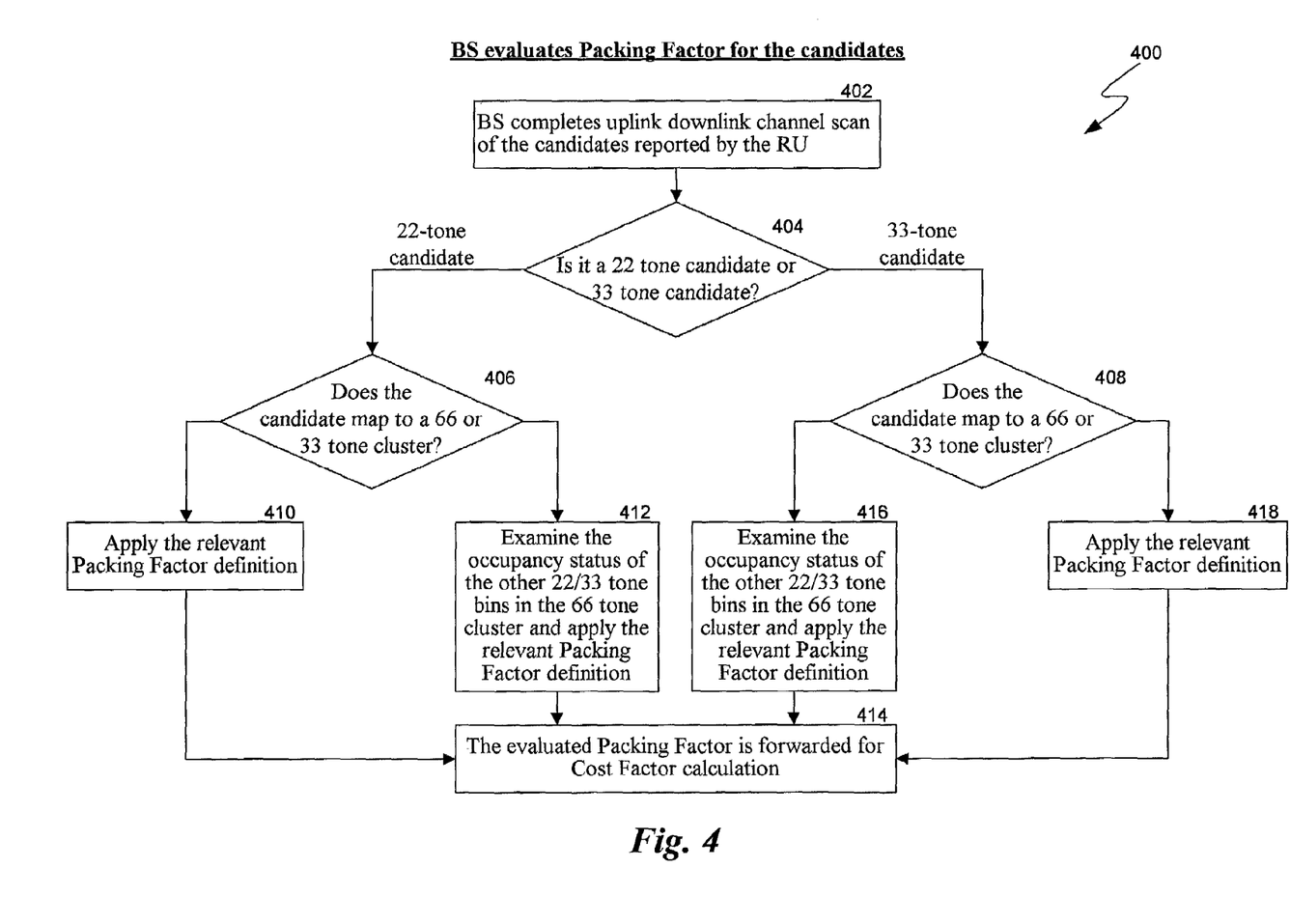
FIG. 4 is a flowchart illustrating a process for deriving a Packing Factor associated with available potential channel selections.

Turning to FIG. 4, there is illustrated a process for deriving the Packing Factor associated with the available potential channel selections 400. In step 402, the BS completed an uplink/downlink channel scan of the candidates reported by the RU. The steps associated with deriving the Packing Factor apply equally to both uplink and downlink channel evaluation. In some embodiments, the RU selects the four best uplink channels and the four best downlink channels for Cost Factor analysis, each of which are evaluated in step 402. By way of example, the 1 MHz band 200 can include only uplink, only downlink or both uplink and downlink communications. Where needed, a second 1 MHz frequency band can be used to provide any additional needed communications. In step 404, the BS queries whether the selected channel being considered is a 22 tone candidate or a 33 tone candidate. For purposes of this evaluation, 33 tone clusters and 66 tone clusters may be broken down into either 22 tone candidates or 33 tone candidates. If the candidate is a 22 tone candidate, then the BS proceeds to step 406, if not, then the BS proceeds to step 408. In step 406, the BS queries whether the candidate maps to a 66 tone cluster or a 33 tone cluster. If the candidate maps to a 33 tone cluster, then the BS proceeds to step 410, otherwise, the BS proceeds to step 412. In step 410, the BS applies the relevant Packing Factor definition as defined below and proceeds to step 414. Returning to step 406, if the candidate maps to a 66 tone cluster, the BS tone in step 412 examines the occupancy status of the other 22 and 33 tone bins in the 66 tone cluster and applies the relevant Packing Factor definition, then the BS proceeds to step 414. In step 414, the evaluated Packing Factor is forwarded for overall Cost Factor calculation and the process may begin again as needed.

Returning to step 404, if the selected channel being considered is a 33 tone candidate, the BS proceeds to step 408. In step 408, the BS queries whether the candidate maps to a 66 tone cluster or a 33 tone cluster. If the candidate maps to a 66 tone cluster, then the BS proceeds to step 416, otherwise, the BS proceeds to step 418. In step 416, the BS will examine the occupancy status of the other 22 and 33 tone bins in the 66 tone cluster and apply the relevant Packing Factor definition, then proceed to step 414. Returning to step 408, if the candidate maps to a 33 tone cluster, then the BS applies the corresponding Packing Factor definition in step 418, then the BS proceeds to step 414.

The Packing Factor is defined for all possible scenarios where an evaluation is required. In the less desirable case where only QPSK modulation will work because of interference and/or noise, the entire 66 tone cluster is consumed and no additional evaluation is considered so a Packing Factor is not assigned in that situation. In many other situations as described herein, a Packing Factor is defined. In some embodiments, present the Packing factor ranges from 1.0 to 1.5, inclusive. The packing factor is defined in such a way as to be no lower than one, the best case, which corresponds to a situation in which only one type of modulated channel will fit in the remaining space without rendering any tones unusable. Every other scenario includes its own level of risk of inefficient channel packing and that risked channel packing inefficiency may vary in terms of the magnitude of the inefficiency. The Packing Factor has been defined in such a way as to reflect that risk and the associated magnitude of inefficiency to assist in the evaluation of the relative costs of selecting each channel and modulation scheme.

Figure 5:
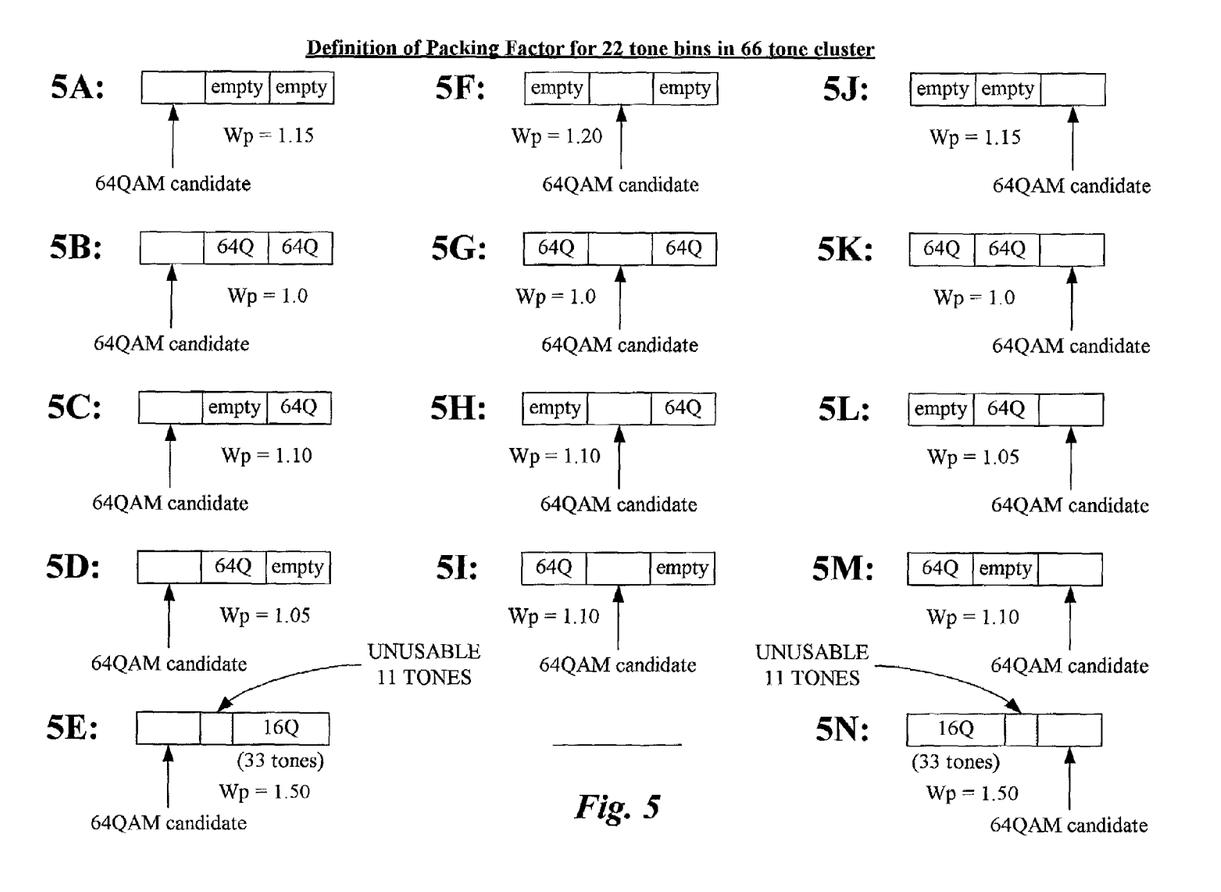
FIG. 5 is an block representation overview illustrating Packing Factor definitions for 14 different scenarios in which 22 tone bin candidates are being considered for use in part of a 66 tone cluster.

Turning to FIG. 5, there are illustrated the Packing Factor definitions for fourteen different scenarios in which 22 tone bin candidates are being considered for use in part of a 66 tone cluster. Generally speaking, the tones increase in frequency from left to right. In scenarios 5A through 5E, the left 22 tones are potential 64-QAM candidates while the remaining 44 tones are utilized in five different ways. In scenario 5A, the Packing Factor $W_p$ equals 1.15, which is greater than the optimal case where $W_p$ equals one, reflecting an increased cost. The Packing Factor in scenario 5A is greater than one because in some future packing scenarios assuming that 64-QAM is used in the left 22 channels, it may turn out that the remaining 44 unused tones cannot be used with 64-QAM or may not even be able to be used at all. In scenario 5B, $W_p$ equals 1.0, reflecting an optimal case where only a 64-QAM channel can fit, given that the other 44 tones are used in two existing 64-QAM channels, and that is what is selected. Scenario 5B results in zero unused tones and 100% used tones, giving us maximum efficiency. In scenario 5C, $W_p$ equals 1.1, reflecting risk intermediate between scenarios 5A and 5B. In this case the right 22 tones are already consumed by a 64-QAM channel and the middle 22 tones are unused. The problem here is that the Channel Factor of the middle 22 unused tones may be beyond the Noise Threshold for a 64-QAM channel, the only channel that will fit into a 22 tone bin in some embodiments of the invention, and thus may go unused. In scenario 5D, $W_p$ equals 1.05, representing a decreased risk from scenario 5C in part because the middle 22 tones are already used in a 64-QAM channel, decreasing the risk of inefficient channel packing by using a 64-QAM channel in the left 22 tones because at this point that is the only channel that will fit into the left 22 tone bin in some embodiments of the invention. In scenario 5E, a 16-QAM channel already exists in the right half of the 66 tone cluster, therefore selection of 64-QAM candidate will result in 11 unusable tones, decreasing efficiency. In scenario 5E, $W_p$ equals 1.5.

Turning to scenarios 5F through 5I in FIG. 5, the middle 22 tones are potential 64-QAM candidates while the remaining 44 tones are utilized in four different ways. In scenario 5F, the Packing Factor $W_p$ equals 1.20, reflecting the risk of both 22 tone bins on the left and right being unusable due to noise and interference. In scenario 5G, $W_p$ equals 1.0. In scenario 5H, $W_p$ equals 1.1, analogous to scenario 5C. In scenario 5I, $W_p$ equals 1.1, again analogous to scenario 5C.

Turning to scenarios 5J through 5N in FIG. 5, we see a correspondence to scenarios 5A through 5E. In scenario 5J, $W_p$ equals 1.15, analogous to scenario 5A. In scenario 5K, $W_p$ equals 1.10, analogous to scenario 5B. In scenario 5L, $W_p$ equals 1.05, analogous to scenario 5D. In scenario 5M, $W_p$ equals 1.10, analogous to scenario 5C. Finally, in scenario 5N, $W_p$ equals 1.5, analogous to scenario 5E.

Figure 6:
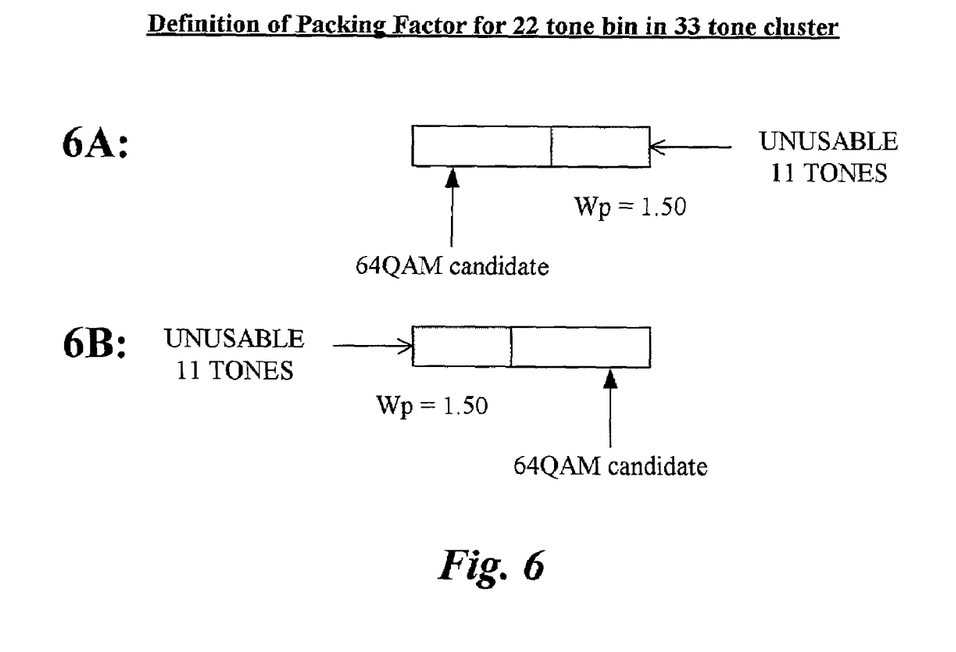
FIG. 6 is an block representation overview illustrating Packing Factor definitions for two different scenarios in which 22 tone bin candidates are being considered for use in part of a 33 tone cluster.

Turning to FIG. 6, there are illustrated the Packing Factor definitions for two different scenarios in which 22 tone bin candidates are being considered for use in part of a 33 tone cluster. In scenarios 6A and 6B, use of a 22 tone bin 64-QAM channel will result in 11 unusable tones. In scenario 6A, the left 22 tones are the potential 64-QAM candidate while the remaining 11 tones are unusable and the Packing Factor $W_p$ equals 1.5. In scenario 6B, the right 22 tones are the potential 64-QAM candidate while the remaining 11 tones are unusable and the Packing Factor $W_p$ equals 1.5.

Figure 7:
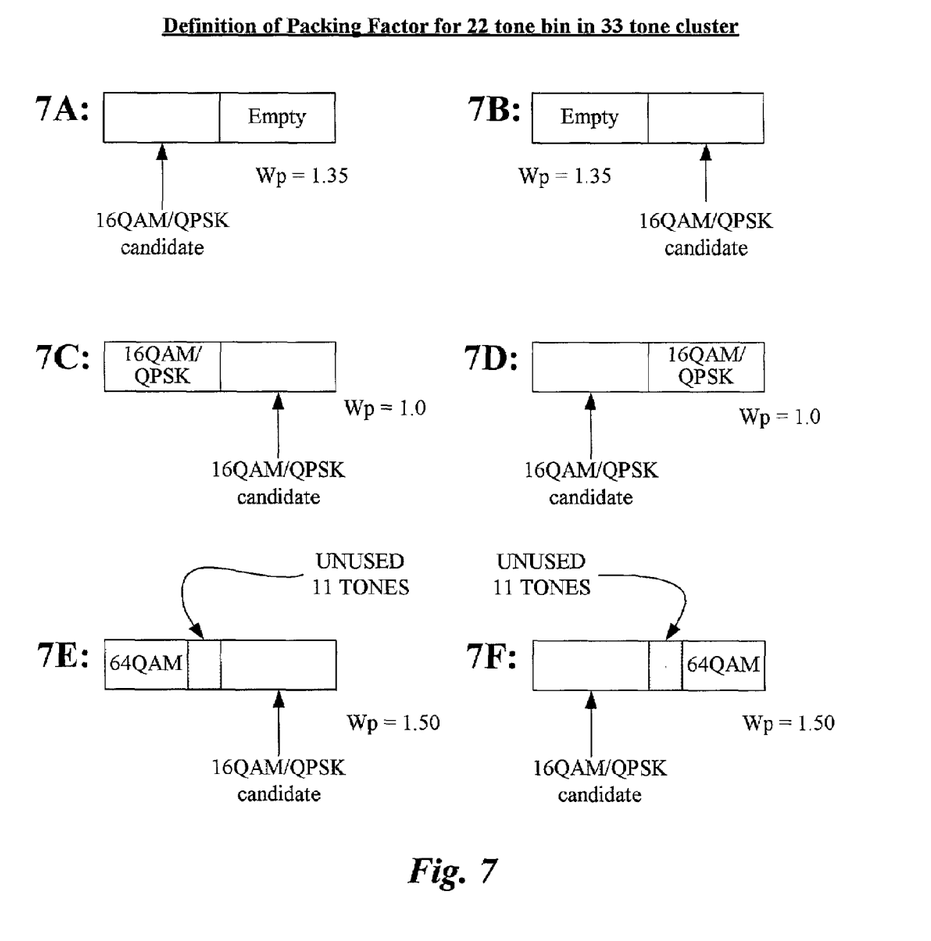
FIG. 7 is an block representation overview illustrating Packing Factor definitions for six different scenarios in which 33 tone bin candidates are being considered for use in part of a 66 tone cluster.

Turning to FIG. 7, there are illustrated the Packing Factor definitions for six different scenarios in which 33 tone bin candidates are being considered for use in part of a 66 tone cluster. Note that in some embodiments of the invention the QPSK-modulated channels are capable of being split into two 33 tone non-contiguous half channels. In scenarios 7A and 7B, use of a 33 tone bin 16-QAM channel, or one half of a QPSK 66 tone channel, will result in 11 unusable tones. In scenario 7A the 16-QAM/(half)QPSK channel is placed in the left half of an empty 33 tone cluster, in scenario 7B the 16-QAM/QPSK channel is placed in the right half of an empty 33 tone cluster, in either case the Packing Factor $W_p$ equals 1.35. In scenarios 7C and 7D, use of the 33 tone bin 16-QAM/QPSK channel will result in no unusable tones in either scenario because only 33 unused tones remain in the right and left portions of the 66 tone cluster, so in either case the Packing Factor $W_p$ equals 1.0. In scenarios 7E and 7F, the addition of a 33 tone bin 16-QAM/QPSK channel to a QPSK 66 tone channel that already contains a 22 tone 64-QAM channel, will result in 11 unusable tones. In scenario 7E the 16QAM/QPSK channel is placed in the right half of the 33 tone cluster, in scenario 7F the 16-QAM/QPSK channel is placed in the left half of the 33 tone cluster, in either case the Packing Factor $W_p$ equals 1.5.

Figure 8:
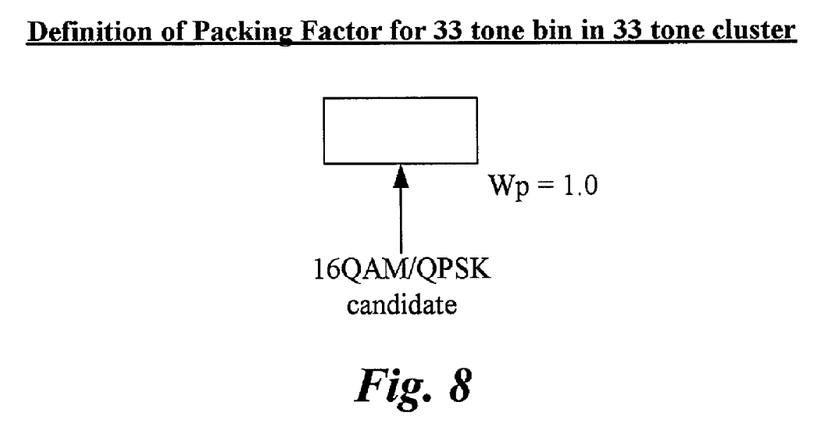
FIG. 8 is an block representation overview illustrating Packing Factor definitions for one scenario in which a 33 tone bin candidate is being considered for use in a 33 tone cluster.

Turning to FIG. 8, there are illustrated the Packing Factor definition for one scenario in which a 33 tone bin 16-QAM/QPSK channel candidate is being considered for use in part of a 33 tone cluster. In this scenario all tones will be utilized, resulting in zero unusable tones and the Packing Factor $W_p$ equals 1.0.

Returning briefly to FIG. 3, in step 306, the BS evaluates the Modulation Type Factor $W_m$. Analogous to the Packing Factor, the Modulation Type Factor is evaluated on the basis of a penalty factor. In some embodiments of the invention, for example, a 64-QAM channel using 22 tones is the best case and has no penalty, i.e., $W_m$ equals 1.0. Because 16-QAM uses 33 tones to transmit the same amount of information as a 22 tone 64-QAM channel, $W_m$ equals 33/22=1.5 for a 16-QAM channel. In a similar fashion, because QPSK uses 66 tones to transmit the same amount of information as a 22 tone 64-QAM channel, $W_m$ equals 66/22=3.0 for a QPSK channel. Additional modulation schemes can be added and their Modulation Type Factors calculated in the same fashion with reference to the most efficient modulation scheme.

Returning briefly to FIG. 3, step 308, the BS evaluates the Candidacy Factor CF against the Noise Threshold $N_t$. Unlike the Packing Factor and the Modulation Type Factor, the Candidacy Factor is evaluated as a threshold matter, i.e., the Cost Factor equation is not reached for any given modulation scheme unless the Candidacy Factor ("CF"), representing the noise present on an candidate channel, is less than the Noise Threshold ("$N_t$") for that modulation scheme. Each modulation scheme can tolerate only so much noise and therefore has a Noise Threshold ("$N_t$") above which the noise level is deemed to be too high and below which the noise level is deemed to be acceptable. To derive the Candidacy Factor a Receiving Unit ("RU"), for example a mobile handset or RU, periodically scans channel candidates in the 1 MHz electromagnetic space 100 to measure the level of noise due to, for example, co-channel interference from the adjacent channels and spurious emission from other sources. The noise measurements are compared against respective modulation scheme thresholds and in some embodiments of the invention, the four best uplink channels and the four best downlink channels are submitted to the BS for Cost Factor analysis. The BS then evaluates the CF against the Noise Threshold for the relevant modulation type.

Figure 9:
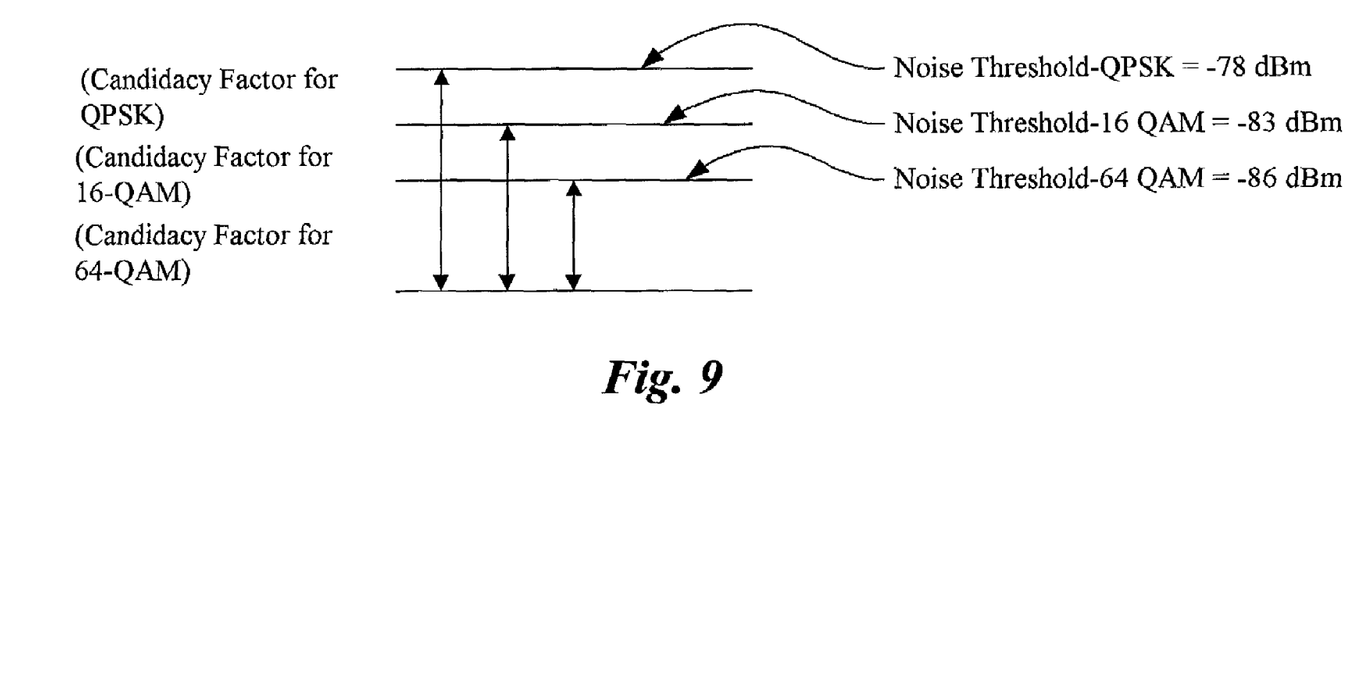
FIG. 9 shows is a diagram (not to scale) illustrating the relative Candidacy Factors acceptable for three representative modulation schemes, i.e., QPSK, 16-QAM and 64-QAM.

Turning to FIG. 9, in some embodiments of the invention, the Noise Threshold $N_t$ for QPSK is −78 dBm, for 16-QAM is −83 dBm and for 64-QAM is −86 dBm. In FIG. 9, the Candidacy Factor CF is shown as a range of acceptable noise levels compared against the various Noise Thresholds to determine if the modulation scheme is a viable candidate. Candidacy Factor is DCA Quality Threshold minus the measured RSSI. In this example if the measured RSSI is greater than −78 dBm, then the CF is negative, that is less than zero, then the interference plus noise is too great for QPSK, 16QAM and 64 QAM modulation types, that channel is thus currently unusable. If measured RSSI is greater than −83 dBm but less than −78 dBm, then the channel is suitable for QPSK modulation only. If measured RSSI is between is between −83 dBm and −86 dBm, then that candidate channel is suitable for QPSK and 16-QAM only. In the best case, if measured RSSI is less than −86 dBm, then that candidate channel is suitable for QPSK, 16-QAM and 64-QAM.

It should be noted that some embodiments of the present invention are implemented in software and hardware associated with a base station. In other embodiments, general purpose or special purpose computers may be utilized.

The description herein provides specific details for a thorough understanding of, and enabling description for embodiments of the invention. However, one skilled in the art will understand that the invention may be practiced without these details. In other instances, well-known structures and functions have not been shown or described in detail to avoid unnecessarily obscuring the description of the embodiments of the invention. While aspects of the invention are described herein as employing 64-QAM, 16-QAM and QPSK modulation schemes, those skilled in the relevant art will recognize that aspects of the invention are equally applicable with other communication protocols and standards where channels consuming different amounts of the electromagnetic spectrum are in proximity to one another.

Thus, there is described herein is a system and method for efficiently assigning channels using adaptive modulation in wireless communications. The advantages of the invention combine to overcome or mitigate a number of shortcomings of prior communication systems as well as provide additional benefits. For example, embodiments of the invention recognize and overcome the problem of inefficient channel assignment in order to maximize use of the available electromagnetic spectrum. Furthermore, embodiments of the invention provide a relatively compact solution that can be implemented in a wireless communication environment without undue expenditures on equipment or presenting an undue burden on wireless communications.

Those skilled in the relevant art will appreciate that while the invention is described herein in combination with wireless handsets, the invention may employ any wireless communication standard or device. Such a standard or device may have less functionality and be cheaper to implement than some embodiments of the invention. Aspects of the invention such as the receiver unit ("RU") or base station ("BS") can be embodied in general purpose or special purpose communications devices that may be intended to provided a fixed location wireless capability or intended to provide a mobile wireless capability. Those skilled in the relevant art will appreciate that while the invention is described herein in combination with digitized voice communications, other forms of communications such as analog communications of data communications may be used. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein can be applied to other systems, not necessarily the system described herein.

The various embodiments described herein can be combined to provide further embodiments. These and other changes can be made to the invention in light of the detailed description.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for allocating communications channels selected from a plurality of available communications channels and for selecting an associated modulation method from a plurality of candidate modulation methods for establishing wireless communications with a receiver, comprising:
    selecting a plurality of candidate communications channels from the available communications channels;
    measuring noise on each candidate communications channel in the plurality of candidate communications channels to provide a channel noise level for each candidate communications channel;
    comparing the channel noise level associated with of each candidate communications channel with a noise threshold associated with each candidate signal modulation method of the plurality of available signal modulation methods to eliminate any unacceptable candidate signal modulation methods;
    assigning a packing factor associated with each combination of each candidate channel with a candidate signal modulation method, the packing factor having a value influenced by conditions in at least one other channel;
    assigning a modulation efficiency factor based at least in part on the amount of information that can be transmitted by a candidate modulation method;
    deriving a cost factor at least in part by combining the packing factor and the modulation efficiency factor; and
    selecting a least-cost channel from the plurality of candidate communications channels and selecting an associated least-cost modulation method from the plurality of candidate modulation methods based on the best cost factor from the plurality of candidate communications channels and the plurality of candidate signal modulation methods.

2. The method of claim 1, wherein the step of selecting a least-cost channel is performed in a radio base station.

3. The method of claim 1, wherein the step of measuring noise on each candidate communications channel is performed by the transmission of a pilot signal between a base station and a wireless telephone.

4. The method of claim 1, wherein the channel noise level is a Candidacy Factor.

5. The method of claim 1, wherein the step of deriving a cost factor is performed by multiplying the packing factor and the modulation efficiency factor.

6. The method of claim 1, wherein the available communications channels is comprised of at least four available communications channels.

7. The method of claim 1, wherein the plurality of available signal modulation methods includes three different signal modulation methods each having a different associated modulation efficiency factor.

8. The method of claim 1, wherein the step of assigning a packing factor, further comprises the packing factor having a value influenced by conditions in a cluster of channels.

9. The method of claim 1, wherein the step of selecting a least-cost channel from the plurality of candidate communications channels and selecting an associated least-cost modulation method from the plurality of candidate modulation methods further comprises deriving a cost factor by multiplying the packing factor and the modulation efficiency factor and selecting the candidate communications channel and associated modulation method with the numerically smallest cost factor of those considered.

10. A method for allocating communications channels selected from a plurality of available communications channels in combination with an associated signal modulation method for establishing wireless communications, comprising:
    selecting a plurality of candidate communications channels from the available communications channels;
    assigning a packing factor associated with each combination of each candidate channel in the plurality of candidate communications channels with the associated signal modulation method, the packing factor having a value influenced by one or more conditions in at least one other channel;
    deriving a cost factor based at least in part on the packing factor; and
    selecting a least-cost channel from the plurality of candidate communications channels, based on the cost factor from the plurality of candidate communications channels.

11. The method of claim 10, wherein the step of selecting a least-cost channel is performed in a radio base station.

12. The method of claim 10, wherein the step of deriving a cost factor is performed by multiplying the packing factor by a modulation type factor.

13. The method of claim 10, wherein the available communications channels is comprised of at least four available communications channels.

14. The method of claim 10, wherein the step of assigning a packing factor, further comprises the packing factor having a value influenced by conditions in a cluster of channels.

15. The method of claim 10, wherein the step of selecting a least-cost channel from the plurality of candidate communications channels and selecting an associated least-cost modulation method from the plurality of candidate modulation methods further comprises deriving a cost factor by multiplying the packing factor and by a modulation type factor and selecting the candidate communications channel and associated modulation method with the numerically smallest cost factor of those considered.

16. A system for allocating communications channels selected from a plurality of available communications channels and for selecting an associated modulation method from a plurality of candidate modulation methods for establishing wireless communications with a receiver, comprising:

means for selecting a plurality of candidate communications channels from the available communications channels;

means for measuring noise on each candidate communications channel in the plurality of candidate communications channels to provide a channel noise level for each candidate communications channel;

means for comparing the channel noise level associated with of each candidate communications channel with a noise threshold associated with each candidate signal modulation method of the plurality of available signal modulation methods to eliminate any unacceptable candidate signal modulation methods;

means for assigning a packing factor associated with each combination of each candidate channel with a candidate signal modulation method, the packing factor having a value influenced by conditions in at least one other channel;

means for assigning a modulation efficiency factor based at least in part on the amount of information that can be transmitted by a candidate modulation method;

means for deriving a cost factor at least in part by combining the packing factor and the modulation efficiency factor; and means for selecting a least-cost channel from the plurality of candidate communications channels and selecting an associated least-cost modulation method from the plurality of candidate modulation methods, based on the best cost factor from the plurality of candidate communications channels and the plurality of candidate signal modulation methods.

17. The system of claim 16, wherein the means for selecting a least-cost channel is performed in a radio base station.

18. The system of claim 16, wherein the means for measuring noise on each candidate communications channel is performed by the transmission of a pilot signal between a base station and a wireless telephone.

19. The system of claim 16, wherein the channel noise level is a Candidacy Factor.

20. The system of claim 16, wherein the means for deriving a cost factor is performed by multiplying the packing factor and the modulation efficiency factor.

21. The system of claim 16, wherein the available communications channels is comprised of at least four available communications channels.

22. The system of claim 16, wherein the plurality of available signal modulation methods includes three different signal modulation methods each having a different associated modulation efficiency factor.

23. The system of claim 16, wherein the means for assigning a packing factor, further comprises the packing factor having a value influenced by conditions in a cluster of channels.

24. The system of claim 16, wherein the means for selecting a least-cost channel from the plurality of candidate communications channels and selecting an associated least-cost modulation method from the plurality of candidate modulation methods further comprises deriving a cost factor by multiplying the packing factor and the modulation efficiency factor and selecting the candidate communications channel and associated modulation method with the numerically smallest cost factor of those considered.

25. A system for allocating communications channels selected from a plurality of available communications channels and for selecting an associated modulation method from a plurality of candidate modulation methods for establishing wireless communications with a receiver, comprising:

a base station, further comprising:

base station selection circuitry which selects a plurality of candidate communications channels from the available communications channels;

base station noise measurement circuitry which provides a channel noise level for each candidate communications channel based on measured noise on each candidate communications channel in the plurality of candidate communications channels;

base station comparison circuitry which compares the channel noise level associated with of each candidate communications channel with a noise threshold associated with each candidate signal modulation method of the plurality of available signal modulation methods;

base station packing factor circuitry which assigns a packing factor associated with each combination of each candidate channel with a candidate signal modulation method, the packing factor having a value influenced by conditions in at least one other channel;

base station modulation efficiency circuitry which assigns a modulation efficiency factor based at least in part on an amount of information that can be transmitted by a candidate modulation method;

base station mathematical circuitry which derives a cost factor at least in part from the packing factor and the modulation efficiency factor; and base station comparison circuitry which selects a least-cost channel from the plurality of candidate communications channels and selects an associated least-cost modulation method from the plurality of candidate modulation methods, based on the cost factor from the plurality of candidate communications channels and the plurality of candidate signal modulation methods.

26. The system of claim 25, wherein the channel noise level is a Candidacy Factor.

27. The system of claim 25, wherein the base station mathematical circuitry which derives a cost factor multiplies the packing factor by the modulation efficiency factor.

28. The system of claim 25, wherein the available communications channels is comprised of at least four available communications channels.

29. The system of claim 25, wherein the plurality of available signal modulation methods includes three different signal modulation methods each having a different associated modulation efficiency factor.

30. The system of claim 25, wherein the base station packing factor circuitry, further comprises the packing factor having a value influenced by conditions in a cluster of channels.

31. The system of claim 25, wherein the base station comparison circuitry derives a cost factor by multiplying the packing factor and the modulation efficiency factor and selected the candidate communications channel and associated modulation method with the numerically smallest cost factor of those considered.

32. A computer-readable medium whose contents cause a base station to allocate communications channels selected from a plurality of available communications channels in combination with an associated signal modulation method for establishing wireless communications, comprising:

selecting a plurality of candidate communications channels from the available communications channels;

assigning a first value associated with each combination of each candidate channel in the plurality of candidate communications channels with the associated signal modulation method, the first value having a magnitude influenced by one or more conditions in at least one other channel;

deriving a cost factor based at least in part on the packing factor; and selecting a least-cost channel from the plurality of candidate communications channels, based on the cost factor from the plurality of candidate communications channels.

* * * * *